United States Patent [19]

Miyakawa

[11] 4,322,471

[45] Mar. 30, 1982

[54] HEAT-SENSITIVE RECORDING ELEMENT

[75] Inventor: Nobuhiro Miyakawa, Kobe, Japan

[73] Assignee: Mita Industrial Company Limited, Osaka, Japan

[21] Appl. No.: 133,806

[22] Filed: Mar. 25, 1980

[30] Foreign Application Priority Data

Mar. 30, 1979 [JP] Japan .................................. 54/37070

[51] Int. Cl.$^3$ .............................................. B32B 00/00

[52] U.S. Cl. ...................................... 428/341; 106/21; 106/25; 282/27.5; 427/150; 427/151; 428/342; 428/532; 428/533; 428/537; 428/913; 428/914

[58] Field of Search ................... 106/21, 25; 282/27.5; 427/150, 151; 428/307, 411, 537, 913, 914, 532, 326, 341, 342, 533

[56] References Cited

U.S. PATENT DOCUMENTS 4,032,690 6/1977 Kohmura et al. ................... 427/151

*Primary Examiner*—Bruce H. Hess
*Attorney, Agent, or Firm*—Sherman & Shalloway

[57] ABSTRACT

Disclosed is a heat-sensitive recording element comprising a recording layer including a starch partially esterified with an organic carboxylic acid as a polymeric binder for dispersing therein a leuco pigment and an organic acidic substance. This recording element provides a recorded image excellent in the water resistance and recording characteristics when it is used for thermographic recording. An aqueous solution of this partially esterified starch has a good storage stability and it does not get moldy even if it is stored for a long time.

5 Claims, No Drawings

HEAT-SENSITIVE RECORDING ELEMENT

BACKGROUND OF THE INVENTION (1) Field of the Invention

The present invention relates to a heat-sensitive recording element. More particularly, the present invention relates to a heat-sensitive recording element in which a starch partially esterified with an organic carboxylic acid is used as a polymeric binder for dispersing and binding a leuco pigment and an organic acidic substance.

(2) Description of the Prior Art

The silver salt photographic process, the diazo photographic process, the electrophotographic process and other electric recording processes have heretofore been utilized as means for recording informations. Recently, the thermographic recording process has been noted as the recording process in which a visible image can be directly obtained without performing development and fixation treatments.

A recording element comprising a recording layer formed on a substrate, said recording layer comprising a leuco pigment which is colorless or light-colored in the normal state, an organic acidic substance which is solid at normal temperatures but is fusible under heating, and a polymeric binder in which said leuco pigment and organic acidic substance are dispersed, is broadly used as the recording element for the thermographic recording process. Water-soluble substances capable of dispersing the organic acidic substance and leuco pigment therein without dissolving them are ordinarily used as the polymeric binder. Various starches and starch derivatives such as hydroxyethyl starch, hydroxypropyl starch, carboxymethyl starch, oxidized starch and soluble starch have been known as polymeric binders which meet the above requirement and are available at low costs.

However, certain defects are commonly observed when these starches and starch derivatives are used. For example, since starch or starch derivative is a nutrient for microorganisms, an aqueous solution of a starch or starch derivative readily gets moldy when the aqueous solution is stored. Most of starches and starch derivatives are easily soluble in hot water, but hot water solutions of starches or starch derivatives are readily gelatinized when they are cooled. When a starch derivative not having such tendency is used, the water resistance of the resulting recording layer is extremely poor, and if the recording layer falls in contact with water, flow-out or bleeding of the image is readily caused. Moreover, starches and starch derivatives which have been heretofore used in this field are not satisfactory in such properties as the property of dispersing and binding a leuco pigment and an acidic substance, the easily defoaming property and the water resistance.

SUMMARY OF THE INVENTION

It was found that when a starch partially esterified with an organic carboxylic acid is selected among various starch derivatives and is used as the polymeric binder for formation of a heat-sensitive recording layer, the abovementioned defects involved in the conventional starch or starch derivative binders can be eliminated.

In accordance with the present invention, there is provided a heat-sensitive recording element comprising a substrate and a recording layer formed on said substrate, said recording layer comprising a leuco pigment, an organic acidic substance which is solid at normal temperatures and is fusible under heating, and a polymeric binder in which said leuco pigment and organic acidic substance are dispersed, wherein said polymeric binder is a starch partially esterified with an organic carboxylic acid.

DETAILED DESCRIPTION OF THE PREFERRED EMBODIMENTS

The starch partially esterified with an organic carboxylic acid (hereinafter referred to as "CPES"), that is used in the present invention, is characterized in that even if it is stored for a long time in the form of an aqueous solution, molds such as blue mold and white mold are not formed and it is very excellent in the storage stability. Furthermore, CPES is easily soluble in hot water, and even if a hot water solution is cooled to room temperature, gelation is not caused and a heat-sensitive recording layer formed from this solution is much excellent in the water resistance over heat-sensitive recording layers formed from solutions of other starch derivatives. CPES that is used in the present invention is characterized in that a leuco pigment and an organic acidic substance can be dispersed in the finely divided form in CPES without gelation of CPES as the binder or agglomeration or coarsening of dispersed particles. Accordingly, a color of a high density can be formed on heating for coloration. Furthermore, the adhesion of the recording layer to the substrate is remarkably strong and the cohesive force of the recording layer per se is very high. Still further, the solution of CPES has a relatively low viscosity and has no bubbling property, and the solution of CPES has a good adaptability to the coating operation.

CPES that is used in the present invention is a known substance and can easily be obtained by partially acylating starch with an anhydride of an organic carboxylic acid. As the organic carboxylic acid, there are preferably used monocarboxylic acids having up to 6 carbon atoms, such as formic acid, acetic acid, propionic acid and butyric acid. Dibasic acids such as succinic anhydride, maleic acid, fumaric acid and phthalic anhydride or aromatic monocarboxylic acids such as benzoic acid and phenylacetic acid may be used singly or in the form of mixtures with lower monocarboxylic acids.

It is important that the esterified starch that is used in the present invention should be partially esterified with an organic carboxylic acid. An esterified starch in which all of hydroxyl groups (three hydroxyl groups) of the glucose unit are esterified (acylated) is completely insoluble in water and this starch cannot be used for attaining the objects of the present invention.

CPES especially suitable for attaining the objects of the present invention is one having 0.01 to 0.2 acyl group (ester group), especially 0.02 to 0.1 acyl group, per glucose residue on the average (hereinafter referred to as "substitution degree"). If the number of the acyl group is smaller than 0.01 per glucose residue, the mold resistance and solubility are insufficient, and if the number of the acyl group is larger than 0.2 per glucose residue, the water resistance and viscosity characteristic are not satisfactory.

All of leuco pigments that have heretofore been used for heat-sensitive recording papers can be used in the present invention. For example, there may be used triphenylmethane type leuco pigments, fluoran type leuco pigments, spiropyran type leuco pigments, rhodamine lactam type leuco pigments, auramine type leuco pigments and phenothiazine type leuco pigments. These leuco pigments may be used singly or in the form of mixtures of two or more of them. Preferred examples of these leuco pigments are described below.

Triphenylmethane Type Leuco Pigments 3,3-Bis-(p-dimethylaminophenyl)phthalide, 3,3-bis-(p-dimethylaminophenyl)-6-dimethylaminophthalide, 3,3-bis-(p-dimethylaminophenyl)-6-diethylaminophthalide, 3,3-bis-(p-dimethylaminophenyl)-6-methoxyphthalide, 4-hydroxy-4'-dimethylaminotriphenylmethane lactone and 4,4'-bis-dihydroxy-3,3'-bis-diaminotriphenylmethane lactone.

Fluoran Type Leuco Pigments

3-Dimethylamino-5,7-dimethylfluoran, 3-diethylamino-5,7-dimethylfluoran, 3-diethylamino-6,7-dimethylfluoran, 3-cyclohexylamino-6-chlorofluoran, 3-dimethylamino-6-methoxyfluoran, 3,6-bis-β-methoxyethoxyfluoran, 3-diethylamino-7-dibenzylaminofluoran, 3-diethylamino-6-methyl-7-chlorofluoran, 3-diethylamino-6-methyl-7-anilinofluoran, 3,7-bis-diethylaminofluoran and 3-diethylamino-7-methoxyfluoran.

Spiropyran Type Leuco Pigments

8'-Methoxybenzoindolinospiropyran, 3-phenyl-8'-methoxybenzoindolinospiropyran, 6'-chloro-8'-methoxybenzoindolinospiropyran, 5,6'-dichloro-8'-methoxybenzoindolinospiropyran, 4,7,8'-trimethoxybenzoindolinospiropyran, benzo-β-naphthospiropyran, 3-methyl-di-β-naphthospiropyran and 1,3,3-trimethyl-6'-chloro-8'-methoxyindolinobenzospiropyran.

Rhodamine Lactam Type Leuco Pigments 9-(p-Nitroanilino)-3,6-bis-(diethylamino)-9-xanthyl-o-benzoic acid lactam and 2-[3,6-bis-(diethylamino)-9-(o-chloroanilino)xanthyl]-benzoic acid lactam.

Auramine Type Leuco Pigments 2,5-Dichloro-N-phenylleucoauramine, 4,4'-bis-dimethylamino-3,4-chlorophenylleucoauramine and 4,4'-bis-dimethylaminopiperazine-hydrol.

Phenothiazine Type Leuco Pigments

Benzoylleucomethylene blue, p-chlorobenzoylleucomethylene blue, 3,4-dichlorobenzoylleucomethylene blue and p-methoxybenzoylleucomethylene blue.

An organic acidic substance which is solid at normal temperatures and is fusible under heating is selected among organic acidic substances customarily used for formation of heat-sensitive recording papers and is used in combination with a leuco pigment such as mentioned above. As specific examples, there can be mentioned 4,4'-isopropylidenediphenol, 4,4'-methylene-bis-(2,6-tert-butylphenol), 4,4'-isopropylidene-bis-(2-chlorophenol), 4,4'-isopropylidene-bis-(2,6-dichlorophenol), 4,4'-isopropylidene-bis-(2,6-dimethylphenol), 4,4'-isopropylidene-bis-(2-tert-butylphenol), 4,4'-sec-isobutylidene-bis-(2-methylphenol), 4,4'-cyclohexylidenediphenol, 2,2'-thio-bis-(4,6-dichlorophenol), p-tert-butylphenol, 3,4-dichlorodiphenol, 0,0'-diphenol, 4-hydroxydiphenoxide, 2,2'-dihydroxybisphenol, 2,2'-methylene-bis-(4-chlorophenol), 2,6-dihydroxybenzoic acid and 1-hydroxy-2-naphthoic acid.

In the present invention, it is preferred that the leuco pigment be used in an amount of 30 to 70% by weight (all of "%" and "parts" given hereinafter are by weight), especially 40 to 60%, based on the CPES binder, and that the organic acidic substance be used in an amount of 100 to 400%, especially 150 to 350%, based on the CPES binder.

Known additives may be added in known amounts so as to improve various properties of the heat-sensitive recording layer. For example, a white pigment such as titanium dioxide or a filler such as clay or calcium carbonate may be incorporated so as to improve the whiteness of the recording layer or increase the volume of the recording layer. Furthermore, animal, vegetable and mineral waxes such as paraffin wax and carnauba wax, fatty acids and their derivatives such as stearic acid, various soaps and fatty acid amides and synthetic waxes such as polyethylene wax, polypropylene wax and polyethylene glycol may be incorporated so as to adjust the recording sensitivity. Alkanol amines such as triethanol amine and other organic bases may be incorporated so as to prevent coloration of the background (background coloration). A water resistance improver and a defoaming agent may be incorporated if desired, though in the present invention it is ordinarily unnecessary to use such additives.

A coating composition for formation of the heat-sensitive recording layer may preferably be prepared by dissolving the CPES binder in hot water, cooling the formed solution, dispersing the leuco pigment and the organic acidic substance separately into the solution to form 2 dispersions and mixing them before the coating operation.

As the substrate on which the recording layer is to be formed, there can optionally be used papers, non-woven fabrics, artificial papers, films, metal foils and laminates thereof. It is preferred that the recording layer be formed so that the dry base weight is 2 to 10 $g/m^2$, especially 3 to 8 $g/m^2$.

The heat-sensitive recording element of the present invention is valuable as a recording element for use in facsimile, printers, data communication, computer terminals, measuring instruments, passometers and copying machines including a thermal heat, a heat pen, an infrared flash lamp or a laser device as a heat source.

The present invention will now be described with reference to the following Examples that by no means limit the scope of the invention.

Incidentally, all of "parts" and "%" are by weight in these Examples.

EXAMPLE 1

One part of crystal violet lactone was dispersed in 6.8 parts of a 5% aqueous solution of a binder to form a liquid A. Separately, 5 parts of 4,4'-isopropylidenephenol was dispersed in 34 parts of a 5% aqueous solution of the binder to form a liquid B. The two liquids were sufficiently stirred in ball mills for 10 hours separately, and they were mixed together to form a homogeneous coating composition. The coating composition was coated on high quality paper (base paper for a diazo type photosensitive sheet) by using a wire bar so that the dry base weight of the coating was about 4.5 $g/m^2$. The coating was dried at 60° C. for 5 minutes and was then naturally dried at room temperature.

Seven binders shown in Table 1 were used as the binder. Water was added to the liquid A or B according to need, so that the viscosity of the coating composition was adjusted to a level suitable for the coating operation.

The so-prepared heat-sensitive recording sheet was passed through between heating rollers maintained at 120° C. or 140° C. and moved at a linear speed of 4 cm/sec to effect coloration. The coloring state and other properties of the heat-sensitive recording sheet were examined to obtain results shown in Table 1. The adhesion was evaluated based on results of the peeling test using an adhesive cellophane tape. The coloration density was measured through a red filter by using a reflection densitometer (model PDA-65 manufactured by Konishiroku Shashin Kogyo).

TABLE 1

| Run No. | Binder | Dispersibility | Defoaming Property | Adhesion | Background Coloration | Coloration Density 120° C. | Coloration Density 140° C. |
|---|---|---|---|---|---|---|---|
| 1 | polyvinyl alcohol | X | X | O | O | 0.23 | 0.97 |
| 2 | polyacrylamide | O | X | O | O | 0.24 | 0.79 |
| 3 | starch esterified with acetic acid (substitution degree = 0.02) | O | O | O | O | 0.44 | 1.07 |
| 4 | crosslinked starch | O | X | Δ | O | 0.33 | 0.97 |
| 5 | corn starch | O | X | O | O | 0.41 | 1.00 |
| 6 | acrylic resin emulsion | O | Δ | O | X | 0.76 | 0.90 |
| 7 | ethylene-vinyl chloride copolymer emulsion | O | Δ | O | X | 0.69 | 1.08 |

Note
O: good
Δ: ordinary
X: bad

The used binders were the following commercially available products.

Polyvinyl alcohol:
Gosenol GL-50 manufactured by Nihon Gosei Kagaku Kogyo

Polyacrylamide:
Product manufactured by Yoneyama Yakuhin Kogyo

Acetic acid-esterified starch:
Product manufactured by Nichiden Kagaku

Crosslinked starch:
Product manufactured by Nichiden Kagaku

Acrylic resin emulsion:
Acryl Emulsion HD-3 manufactured by Toa Gosei Kagaku

Ethylene-vinyl chloride copolymer emulsion:
Product manufactured by Sankyo Kasei Corn starch:
Product supplied by Nichiden Kagaku

EXAMPLE 2

Heat-sensitive recording sheets were prepared in the same manner as described in Example 1 except that acetic acid-esterified starch having a substitution degree different from that of the esterified starch used in Example 1 or hydroxypropylated starch (product manufactured by Nichiden Kagaku) was used as the binder. Each sheet was passed through between heating rolls maintained at 150° C. and moved at a linear speed of 4 cm/sec. The colored sample was dipped in water maintained at 25° or 50° C. for 90 seconds to examine the water resistance. More specifically, the coloration density was measured before and after the dipping treatment and the water resistance was evaluated based on the residual ratio of the coloration density. Furthermore, the aqueous solution of the binder was stored at 30° C. for 10 days and formation of molds was checked. The obtained results are shown in Table 2.

TABLE 2

| Run No. | Binder | Coloration Density Before Dipping | After Dipping at 25° C. Coloration Density | After Dipping at 25° C. Residual Ratio (%) | After Dipping at 50° C. Coloration Density | After Dipping at 50° C. Residual Ratio (%) | Mold Resistance |
|---|---|---|---|---|---|---|---|
| 1 | polyvinyl alcohol | 1.12 | 0.91 | 81.3 | 0.75 | 67.0 | O |
| 2 | hydroxypropylated starch | 1.11 | 0.95 | 85.6 | 0.80 | 72.1 | X |
| 3 | acetic acid-esterified starch (substitution degree = 0.01) | 1.15 | 1.11 | 96.5 | 0.95 | 82.6 | Δ |
| 4 | acetic acid-esterified starch (substitution degree = 0.03) | 1.20 | 1.18 | 98.3 | 1.02 | 85.0 | O |
| 5 | acetic acid-esterified starch (substitution degree = 0.05) | 1.20 | 1.15 | 95.8 | 0.98 | 81.7 | O |
| 6 | acetic acid-esterified starch (substitution degree = 0.08) | 1.20 | 1.15 | 95.8 | 0.95 | 79.2 | O |

Note
X: formation of molds observed
Δ: formation of molds not observed but precipitates formed
O: formation of molds or precipitates not observed

EXAMPLE 3

Heat-sensitive recording sheets were prepared by using acetic acid-esterified starches differing in the substitution degree, which were used in Example 2 and 3-dimethylamino-6-methyl-7-anilinofluoran as the leuco pigment in the same manner as described in Example 2. When these heat-sensitive recording sheets were passed through between heating rolls maintained at 140° C. and moved at a linear speed of 4 cm/sec, black images having a reflection density of 1.1 (as determined by using a neutral filter) were obtained on all the heat-sensitive recording sheets. Heat-sensitive recording sheets were prepared in the same manner as described above except that 2.7 parts of a polyethylene emulsion (Chemipar W; solid content=37%; manufactured by Mitsui Sekiyu Kagaku) was added to the coating composition. When these heat-sensitive recording sheets were used for printing using a thermal head, it was found that clear images free of bleeding in copied letters or patterns were obtained and these heat-sensitive recording sheets had excellent recording characteristics and their water resistance was highly improved.

What I claim as my invention is:

1. A heat-sensitive recording element comprising a substrate and a recording layer formed on the substrate, said recording layer comprising a leuco pigment, an organic acidic substance which is solid at normal temperatures and is fusible under heating, and a polymeric binder in which said organic leuco pigment and said organic acidic substance are dispersed, wherein said polymeric binder is hot water-soluble starch partially esterified with a monocarboxylic acid having up to 6 carbon atoms and having 0.01 to 0.2 ester group per glucose unit of the starch, said leuco pigment and said organic acidic substance being present in an amount of 30 to 70% by weight and 100% to 400% by weight, based on the partially esterified starch, respectively.

2. The heat-sensitive recording element, according to claim 1 wherein said monocarboxylic acid is selected from the group consisting of formic acid, acetic acid, propionic acid and butyric acid.

3. The heat-sensitive recording element, according to claim 1 wherein the partially esterified starch has from 0.02 to 0.1 ester group per glucose unit of the starch.

4. The heat-sensitive recording element, according to claim 1 wherein said leuco pigment and said organic acid substance are present in an amount of 40 to 60% by weight and 150 to 350% by weight, based on the partially esterified starch, respectively.

5. The heat-sensitive recording element, according to claim 1 wherein the recording layer is present on the substrate on a dry base weight in the range from 2 to 10 $g/m^2$.

* * * * *